United States Patent [19]
Dalebroux et al.

[11] Patent Number: 5,866,269
[45] Date of Patent: Feb. 2, 1999

[54] AGRICULTURAL MULCH WITH EXTENDED LONGEVITY

[75] Inventors: Dean Dalebroux, Green Bay; Kenneth Glanz, Appleton, both of Wis.

[73] Assignee: Appleton Papers Inc., Appleton, Wis.

[21] Appl. No.: 781,516

[22] Filed: Jan. 9, 1997

Related U.S. Application Data

[63] Continuation-in-part of Ser. No. 660,894, Jun. 10, 1996, Pat. No. 5,672,434.

[60] Provisional application No. 60/002,092 Aug. 10, 1995.

[51] Int. Cl.$^6$ ..................................................... B32B 9/00
[52] U.S. Cl. .................. 428/537.5; 428/17; 428/34.6; 428/35.9; 428/139; 428/147; 428/192; 428/198; 428/224; 428/323; 428/326; 428/913; 47/9; 47/25; 47/32; 47/56; 47/73; 47/79
[58] Field of Search .............................. 428/17, 139, 147, 428/35.9, 34.6, 537.5, 289, 224, 326, 913, 323, 542.8, 198, 192; 47/25, 9, 73, 32, 56, 79, 78, 48.5

[56] References Cited

U.S. PATENT DOCUMENTS

| | | |
|---|---|---|
| 3,274,731 | 9/1966 | Vigneault et al. . |
| 3,384,933 | 5/1968 | Yamamoto et al. . |
| 3,387,405 | 6/1968 | Iwasyk et al. . |
| 3,516,941 | 6/1970 | Matson . |
| 3,545,510 | 12/1970 | Bush, Jr. et al. . |
| 3,623,266 | 11/1971 | Nakayama . |
| 3,859,125 | 1/1975 | Miller et al. . |
| 3,929,937 | 12/1975 | Clendinning et al. . |
| 3,938,280 | 2/1976 | Vandemark et al. . |
| 3,939,606 | 2/1976 | Vandemark et al. . |
| 3,940,884 | 3/1976 | Mason, Jr. . |
| 3,949,145 | 4/1976 | Otey et al. . |
| 4,066,490 | 1/1978 | Yoshimi . |
| 4,081,264 | 3/1978 | Ali . |
| 4,100,103 | 7/1978 | Foris et al. . |
| 4,379,655 | 4/1983 | Brost et al. . |
| 4,403,443 | 9/1983 | Valente . |
| 4,539,038 | 9/1985 | Gombert . |
| 4,580,960 | 4/1986 | Apman et al. . |
| 4,584,790 | 4/1986 | Gaughen . |
| 4,627,191 | 12/1986 | Bergere . |
| 4,686,790 | 8/1987 | Lahalih et al. . |
| 4,782,626 | 11/1988 | Shanley et al. . |
| 4,793,474 | 12/1988 | Drake . |
| 4,794,726 | 1/1989 | Fawcett et al. . |
| 4,910,911 | 3/1990 | Ahm . |
| 5,065,543 | 11/1991 | Brook . |
| 5,139,566 | 8/1992 | Zimmermann . |
| 5,163,247 | 11/1992 | Weber et al. . |
| 5,672,434 | 9/1997 | Dalebroux et al. .................. 428/537.5 |

FOREIGN PATENT DOCUMENTS

| | | |
|---|---|---|
| 42424/85 | 11/1986 | Australia . |
| 59-169992 | 9/1984 | Japan . |
| 60-25902 | 2/1985 | Japan . |
| 61-47900 | 3/1986 | Japan . |
| 1209059 | 2/1986 | U.S.S.R. . |
| 1607713 | 11/1990 | U.S.S.R. . |
| 1434042 | 4/1976 | United Kingdom . |

OTHER PUBLICATIONS

Biodegradable Liquid Polymers as Soil Mulches for Tomatoes; Everett, P.H.; 1 page; 1976.

(List continued on next page.)

*Primary Examiner*—William Krynski
*Assistant Examiner*—Abraham Bahta
*Attorney, Agent, or Firm*—Birch, Stewart, Kolasch & Birch, LLP

[57] ABSTRACT

A novel agricultural mulch and improved method of arranging the mulch on a growing field with furrows is disclosed wherein the mulch is made of an extensible paper substrate having a top surface and a bottom surface with side sections near the edges of the substrate capable of being turned up and bent back over the top surface of the paper substrate as the mulch is laid down over the growing field; the bottom surface of the paper substrate will be exposed for receiving soil from the field to anchor the mulch and protect it against the weathering of rain, sun and wind.

22 Claims, 2 Drawing Sheets

OTHER PUBLICATIONS

Comparison of Polyethylene–Coated Paper and Polyethylene for Mulching Vegetables, Courter, J.W.; Hopen, H.J.; Vandemark, J.S.; pp. 126–129; 1968.

Controlled Release Herbicides, Schreiber, M.M.; Shasha, B.S.; Timnel, D; White, M.D.; pp. 177–191; Arac Report Proj. I–7337; Doc. Ref. 6.2 date 1985.

Effect of Fertilization and Mulching with Bio–Degradeable Polyethylene–Coated Paper on Responses of Okra and Peppers, Albregts, E.E.; Howard, C.M.; pp. 36–38; 1973.

Effect of Paper and Polyethylene Mulches and Plastic Caps on Cantaloupe Yields and Earliness, Clarkson, V.A.; Frazier, W.A.; pp. 400–404; 1956.

Effect of Paper Mulches on Soil Temperature, Soil Moisture, and Yields of Certain Crops, Smith, Alfred; pp. 159–201; 1931.

Evaluation of Paper and Polyethylene–Coated Paper Mulches and Fertilizer Rates for Tomatoes; Everett, Paul H.; pp. 124–128; 1971.

Mulch Paper in Vegetable Production; Hutchins, A.E.; pp. 1–20; 1933.

Mulches for Commercial Vegetable Production; Schales, F.D.; 6 pages date 1975.

Natural Polymers Control Pesticide Release; Worthy, Ward; p. 18; Jun. 1976.

Paper Mulch for Muskmelons in Low Rainfall Areas; Peavy, W.S.; p. 192 date 1973.

Paper Mulch for Pineapples; Savage, C.G.; Barnett, G.B.; pp. 335–336; 1934.

Paper Mulch for the Vegetable Garden; Magruder, R.; pp. 1–60; 1930.

Polyethylene–Coated Urea. 2. Urea Release as Affected by Coating Material, Soil–Type, and Temperature; Salman, O.A.; Hovakeemian, G.; Khraishi, N.; pp. 633–638; 1989.

Permeability of Plastic Films to Fumigants; Kolbezen, M.J.; Abu–El–Haj, F.J.; pp. 476–481 date 1977.

Results of Paper Mulch Experiments with Vegetable Crops; Thompson, H.C.; Platenius, H.; pp. 305–309 1931.

Starch–Based Plastics and Related Products for Agriculture; Otey, F.H.; pp. 77–81; date 1985 ARAC Report Proj. I–7337: Doc. Ref.: 6.21.

Starch–Based Polymers for Agricultural Applications; Doane, W.M.; pp. 103–104; ARAC Report Proj. I–7337: Doc. Ref. 6.17 date 1981.

Tomato Production as Affected by Two Weights of Polyethylene Coated and Uncoated Kraft Paper Mulch, With and Without Fungicide–Herbicide Impregnation; Burgis, D.S.; pp. 147–152 date 1975.

Vegetable Crop Responses to Synthetic Mulches; College of Agriculture, University of Illinois at Urbana–Champaign; pp. 2–34 date 1973.

Water Repellent Soil Mulch for Reducing Fertilizer Nutrient Leaching: II. Variables Governing the Effectiveness of a Siliconate Spray; Snyder, G.H.; Ozaki, H.Y.; Hayslip, N.C.; pp. 678–681 date 1974.

Wet Tensile Breaking Strength of Paper and Paperboard; Approved by the Physical Properties Committee of the Process & Product Quality Division; pp. 1–3; 1987.

Tensile Breaking Properties of Paper and Paperboard (Using Constant Rate of Elongation Apparatus); Approved by the Physical Properties Committee of the Process & Product Quality Division; pp. 1–5; 1988.

Wet Tensile Strength (For Coating); Useful Method 456 date 1988.

Surface Wettability of Paper (Angle of Contact Method); Approved by the Physical Properties Committee of the Process & Product Quality Division; pp. 1–5; 1989.

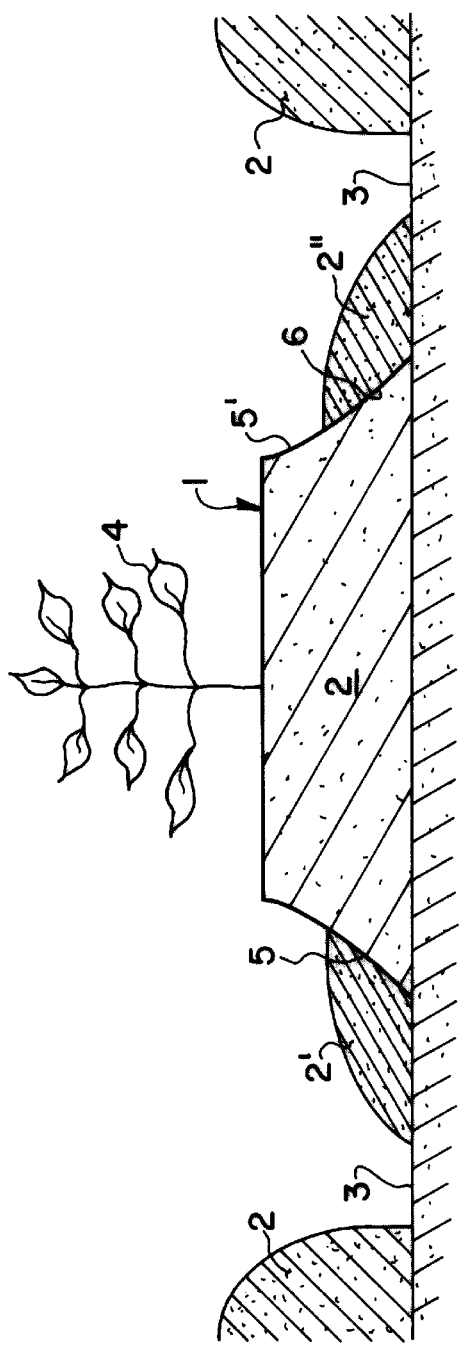
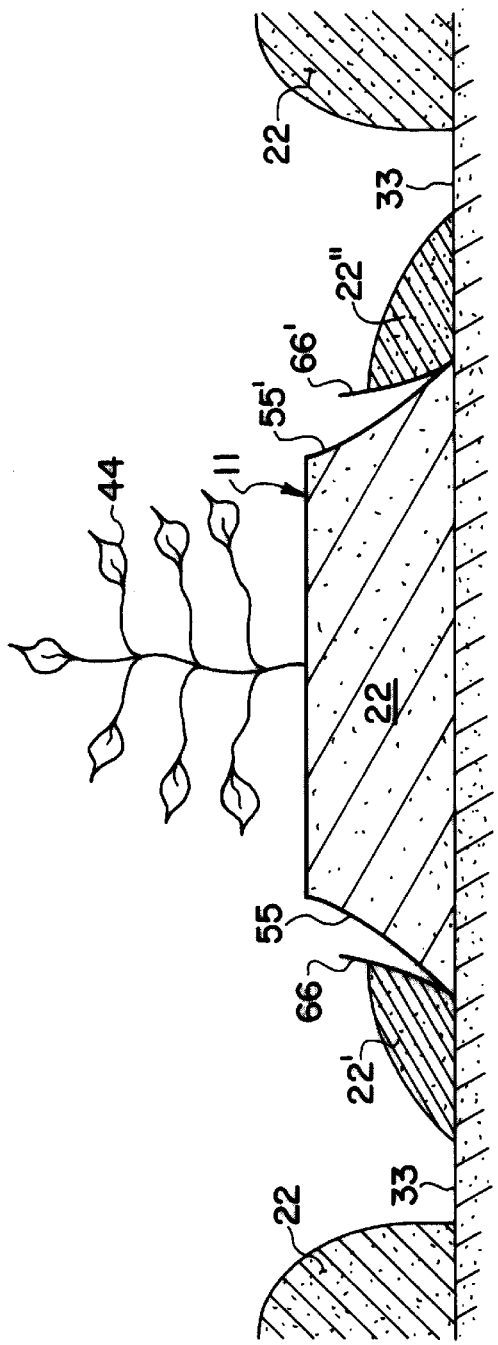

AGRICULTURAL MULCH WITH EXTENDED LONGEVITY

This application is a continuation-in-part of application Ser. No. 08/660,894 filed on Jun. 10, 1996 now U.S. Pat. No. 5,672,434, which claims priority of provisional application Ser. No. 60/002,092 filed on Aug. 10, 1995, now abandoned the entire contents of which are hereby incorporated by reference.

BACKGROUND OF THE INVENTION

1. Field of the Invention

This invention relates to an agricultural mulch and a method of depositing the mulch on a growing field in a manner to extend the longevity of the mulch and protect the mulch against premature degradation and removal from the field.

2. Description of Background Art

Agricultural mulch films are used extensively throughout the world because of the many advantages they provide, including fertilizer retention, fumigant retention, retarded weed growth, increased soil retention of moisture and heat, and reduced soil erosion by winds and rain. Such mulching films also enhance soil structure by preventing soil crusting and soil compaction.

Polyethylene film both in a transparent state and an opaque state, has been the most common synthetic mulch to be used. However, polyethylene film is not degradable and it must be removed from the field and be burned, buried or otherwise discarded at the end of its useful life. The removal and burying or burning of plastic mulch is both costly and has an adverse effect on the ecology. There exists a need for a mulch that would decompose at the end of a growing season. Attempts to meet this need have led to the development of a variety of biodegradable and photodegradable mulch films. For example, Otey et al. U.S. Pat. No. 3,949,145 developed a biodegradable plastic film from starch, polyvinyl alcohol and glycerol, which film is covered with a water-resistant resin coating to prevent premature degradation. The water-resistant resin coating is prepared from a water-resistant resin, such as plasticized polyvinyl chloride, and poly-toluene diisocyanate prepolymer bonding agent.

Another biodegradable mulch film, disclosed by Clendinning, U.S. Pat. No. 3,929,937, is fabricated from a blend of a particulate addition polymer, such as polyethylene, in a matrix of biodegradable thermoplastic oxyalkanoyl polymer, such as $\epsilon$-caprolactone homopolymer. Additional ingredients can be included in the blends. Such additional ingredients include naturally occurring biodegradable products, e.g., tree bark, sawdust, peat moss, cotton seed hulls, and the like, fibrous and non-fibrous fillers, e.g., talc, limestone, bentonite, asbestos, and the like, plant nutrients, fertilizers, insecticides, pesticides, and the like.

In Iwasyk et al., U.S. Pat. No. 3,387,405, there is disclosed a continuous foam mulch which is produced by applying and substantially simultaneously gelling a fluid aqueous foam which comprises at least 0.5 weight percent of dissolved polyvinyl alcohol and at least 50 percent, based on the weight of the polyvinyl alcohol, of emulsified asphalt or wax.

Still other agricultural mulch films have been disclosed by Vigneault et al., U.S. Pat. No. 3,274,731, and Kane, U.S. Pat. No. 3,384,993. Vigneault et al., for example, discloses a mulch film comprised of at least one copolymer consisting essentially of ethylene and an ethylenically unsaturated carboxylic acid monomer such as acrylic acid, methacrylic acid, fumaric acid, maleic acid and the like. Vigneault et al. suggests that their films might also contain nutrients such as ammonia or phosphate-containing additives, and other filler for various mulching uses. Kane also discloses a plastic mulch film that may include solid water-soluble nutrients such as ammonium nitrate, potassium chloride, potassium nitrate, potassium sulfate and urea. However, the only plastic mulch films disclosed by Kane are comprised of polyethylene, polypropylene, cellulose acetate, cellulose acetate butyrate, polyvinyl chloride acetate, styrene acrylonitrile, and the like. These plastic materials are not soluble in water and must, therefore, rely on some other mechanism to impart adequate degradability so that they may be used as an agricultural mulch film that does not have to be removed from the fields after the growing season.

One such degrading mechanism is disclosed by Newland et al., U.S. Pat. No. 3,545,510. In that patent, it is taught to include a prooxidant in a water-insoluble polyolefin film, such as polyethylene, polypropylene or poly(butene-1). Among the pro-oxidants that are disclosed are certain metal acetyl acetonates, metal alkyl benzoylacetates, metal acetyl acetonates, metal stearates and metal oleates.

Alternatives to plastic mulching films have also included paper strip material for sowing seeds. Soviet Patent, SU 1209059A disclosed a paper strip material such as blotting paper to which seeds and fertilizers are applied. The outer surface of the strip material has a coating of herbicide. Seeds are sandwiched between two strips glued together. Another tube-like paper seed strip is disclosed in U.S. Pat. No. 3,623,266.

Japanese Application No. A-59-169992, assigned to Nissan discloses fertilizer sheet production by spreading granules of slow action fertilizer over base paper coated with an adhesive. Japanese Patent #60025902, Feb. 2, 1985 assigned to Dainippon Jochugiku KK discloses an insecticidal paper which comprises paper coated with printing ink and binder containing volatile insecticide which is overcoated with a resin film. Coating used include nitrocellulose, polyamide, ethyl cellulose, acrylate resins, vinyl chloride-vinyl acetate copolymers, and urethane resins.

Japanese Patent #8647900, Mar. 8, 1986 assigned to Oji Paper Co., Ltd. discloses a moisture impermeable controlled release insecticidal sheet. The sheets are made from kraft paper, rubber latex and waxes or waxy substances, and insecticides, fungicides and fungistat.

British Patent No. 1,434,042, discloses a water-soluble or water-dispersible paper made from polyvinyl alcohol on which or into which an active ingredient is incorporated.

U.S. Pat. No. 5,163,247 to Weber et al. discloses a porous fibrous cellulosic web at least partially saturated with latex at 30 dry parts per 100 parts fiber.

While the above-discussed mulch films, and others, have been used with some degree of success, no mulching film disclosed to date has been found to be completely satisfactory commercially in the balance of the important properties needed for a good agricultural mulch. These properties include, for example, good mechanical properties for application by machines and planting by machines, water resistance, field durability, the ability to retard weed growth, degradability and appropriate economics.

The agricultural mulch according to the invention is a special configuration of a mulch having a paper extensible substrate in which the mulch is disposed along the furrows of a growing field in a particular manner. The mulch itself may be coated on its top and bottom surfaces as described in the copending U.S. application Ser. No. 08/660,894 claiming benefit under 35 U.S.C. 119(e) to application Ser. No. 60/002,092 filed Aug. 10, 1995 as a provisional application per 35 U.S.C. 111(b).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a cross-sectional view of a conventional paper mulch positioned on a section of growing field with soil deposited on the sides of the mulch to anchor it down against wind and rain and sunlight;

FIG. 2 is a cross-sectional view of the embodiment of a paper mulch according to the invention showing the configuration with the sides of the mulch bent back at the edges with the soil against the bottom surface of the mulch as an anchor to prevent movement of the mulch caused by weathering: wind, rain and sunlight;

DETAILED DESCRIPTION OF THE PREFERRED EMBODIMENTS

Hereinafter, a preferred embodiment of the present invention will be described with reference to the drawings.

Figure 3:
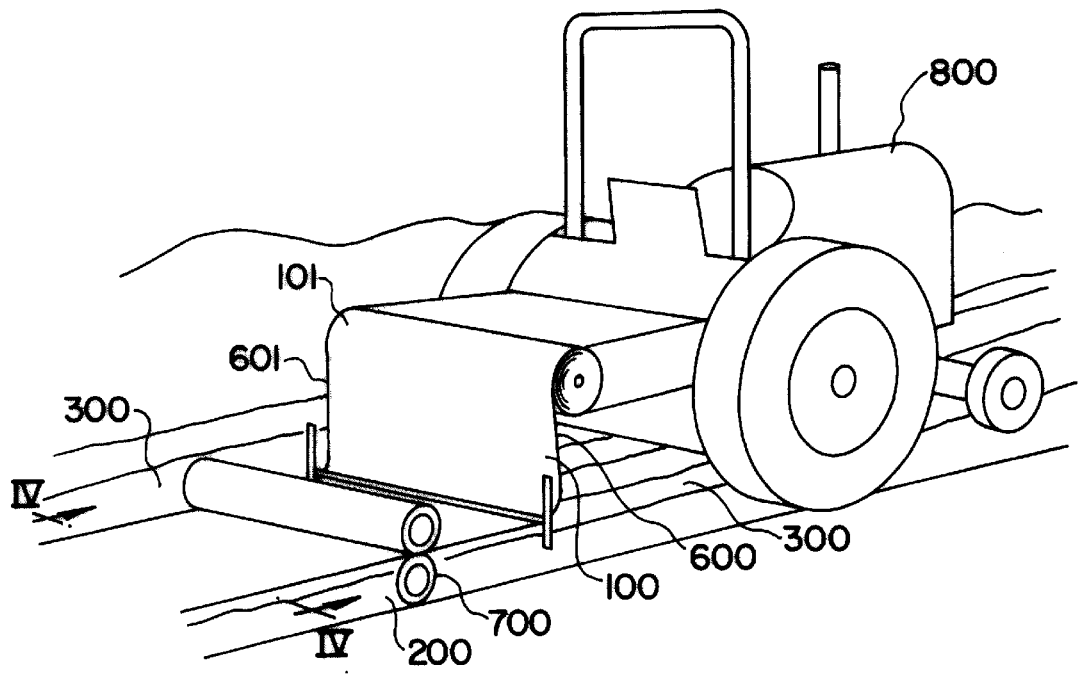
FIG. 3 is a perspective view in schematic form showing the paper mulch strip unrolling on the back of a tractor and being deposited on the growing section of a field between furrows.

FIG. 2 shows the configuration of agricultural mulch and FIG. 3 displays the method of protecting the mulch on a growing field so as to prevent premature degradation and removal from the field. As seen in FIG. 1, a particularly preferred paper mulch comprises a paper substrate (1) having first and second surfaces (5) and (6), respectively, and an adherent coating comprising a film-forming latex applied to the first and second surfaces of the paper substrate (1).

FIG. 1 illustrates the conventional practice of laying an agricultural mulch on a section of soil in the growing field (2). The paper mulch strip (1) is draped over the field (2) and the sides are positioned in the furrows (3) where additional soil (2') and (2") is deposited on the top surfaces (5) and (5') of the paper strip (1). After planting seeds in the soil (2), a plant (4) emerges through an opening in the mulch strip and is protected against the elements and growth of weeds during the growing season as well as holding soil moisture essential for growth of the plant (4). A minimum of three months field durability is needed, while five or six months are preferred, to achieve successful operation of the mulch and growth of the plants in the soil.

FIG. 2 is illustrative of the specific configuration of the agricultural mulch according to the invention and shows the mulch strip (11) draped over the soil (22) of the field in the furrows (33) where the side sections of the strip (11) are bent back over itself with the bottom surfaces (66–66') exposed and covering the top surfaces (55–55'). There is a space between the folds formed by bending back the top surfaces (55–55') which is closed when the soil (22'–22") is pressed against the bottom surfaces (66, 66'). The soil (22', 22") is placed over the mulch partially covering the bottom surfaces (66, 66'). The soil (22', 22") anchors the agricultural mulch strip to the furrows and prevents the wind, rain and sun with soil moisture from causing deterioration of the mulch and consequent loss of the covering for the field where the plant (44) is growing.

FIG. 3 is a perspective view of the laying of a strip of agricultural mulch (100) which is unrolled from a means with a roll (101) on a field with soil (200) and furrows (300). The laying machinery (700) is drawn by a tractor (800) or other similar means along the furrows (300) as the paper strip (100) is laid down in the field. If desired, the strip of mulch can be turned up at the side sections by hand or any other suitable means.

Figure 4:
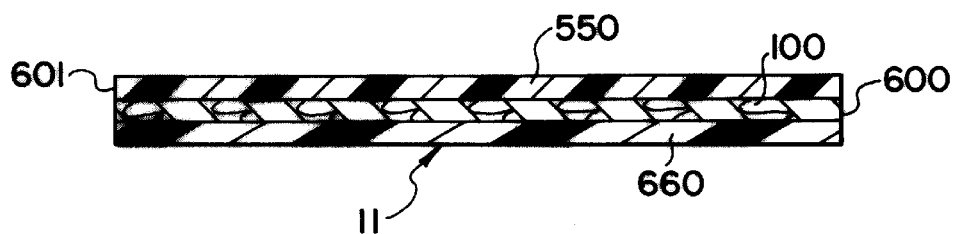
FIG. 4 is a cross section of the agricultural mulch along the line IV–IV' shown in FIG. 3. The paper mulch strip (11) is coated on its top and bottom surfaces with films (550) and (660), respectively. The side edges of the strips are shown as (600) and (601).

FIG. 4 displays a cross-section of the mulch (11) along the line IV–IV' in FIG. 3 of the paper strip (100). The top surface of the strip is covered with a latex film (550) while the bottom surface of the strip is covered with a latex film (660) and the lateral edges of the paper strip (600, 601) are seen in FIG. 4 along the line IV–IV' in FIG. 3.

The novel configuration of the paper mulch according to the invention displayed in FIGS. 2 and 3 promotes field longevity of the paper mulch which is degradable over time depending on soil moisture. The mulch is especially fragile along the edges (600, 601) particularly in extremely wet environments such as the fields in south Florida. There the soil is very moist throughout the growing season. It has now surprisingly been found that utilizing a simple "tuck" in the paper mulch strip as in FIG. 2 along the edges of the paper strip can prolong the life of the mulch.

More particularly, FIG. 2 shows that the present invention is a particular configuration of an agricultural mulch comprising an extensible paper substrate having a top and a bottom surface with a first coating provided on the top surface. The first coating comprises a latex. A second coating is provided on the bottom surface. The second coating comprises a latex and can include a biologically active material. The coatings generally have a thickness of less than 15 $\mu$m. The paper substrate generally should have a minimum thickness of at least 30 $\mu$m.

FIGS. 2 and 3 show the agricultural mulch disposed in specific configuration which is resistant to water penetration and permeability. Water permeability can be measured according to a test method for water permeability set forth in application Ser. No. 60/002,092 filed Aug. 10, 1995 and incorporated herein by reference, such that when said mulch is placed on the surface of water at ambient temperature, the mulch does not curl out of the plane of the surface of the water within five seconds of contact with the water.

The agricultural mulch comprises: a) an extensible paper substrate having a top surface and a bottom surface; b) a first coating on the top surface, said first coating comprising a film-forming latex resistant to water permeability, a pigment, and, if desired, water repellant; c) a second coating on the bottom surface, said second coating comprising a film-forming latex, a pigment and a biologically active material; said extensible paper having an elongation of 5% or more in the machine and cross machine directions; said film forming latex comprising an oil in water emulsion forming a film at drying temperatures of less than 100° C.; said first coating having a coat weight of 6 to 12 pounds per ream of 3300 sq.ft. of the paper substrate (or about 8 to 18 g/m$^2$); said paper substrate preferably having a weight of at least 25 lbs. per ream of 3300 sq.ft. of the paper substrate; said water repellant providing the first coating with a water contact angle of at least 70° and preferably greater than 90°; said agricultural mulch being resistant to water permeability, as measured according to the aforesaid test method for water permeability set forth in application Ser. No. 60/002,092 filed Aug. 10, 1995 herein such that when said mulch is placed on the surface of the water at ambient temperature, said mulch does not curl out of the plane of the surface of the water within 5 seconds of placement in contact with the surface of the water.

The paper substrate can be formed on a paper machine such as a Foudrinier paper machine. Paper made on a paper machine has machine and cross machine directions arising as a result of fiber orientation as pulp slurry is laid down on the forming wire.

The substrate is selected from paper of 25 to 65 pounds and preferably of from 30 to 65 pounds per ream. A ream is 3300 sq.ft. of paper substrate. The paper substrate is thus from about 37 g/m$^2$ to 97 g/m$^2$.

Being largely paper yet resistant to water permeability when first applied, the agricultural mulch is advantageously biodegradable after the fruiting season.

The paper used according to the invention has low air permeability in terms of passage of air through the paper. This parameter can be measured by the volume of air passing through the paper with a fixed time or time for a fixed volume of air to pass through the paper.

The barrier property of the mulch can be measured by methods such as by a Gurley™ porosity test instrument in accordance with TAPPI test method T460-on-88 which measure the time required in seconds to displace 100 cubic centimeters of air through an area of 6.4 sq.cm.

The mulch used according to the invention is a nonporous structure. The substrate is not saturated by the latex coating; instead the film-forming latex is applied as coatings on the top and bottom surfaces of the substrate typically from 6 to 12 pounds based on a ream of 3300 sq.ft. of the paper substrate (or about 8 to 18 g/m$^2$). The paper substrate would have a weight of from 25 to 65 pounds per ream of 3300 sq.ft. of the paper substrate (or about 37 g/m$^2$ to about 97 g/m$^2$).

The agricultural mulch configuration used according to the invention is a nonporous structure and not saturated with the latex. Porosities of the agricultural mulch of the invention exceed 5000 seconds per 100 cubic centimeters of air displacement for a single sheet.

The ratio of wet tensile strength to dry tensile strength of the agricultural mulch of the invention is from 0.9 to about 1.7. The agricultural mulch disposed according to the invention does not lose appreciable strength upon wetting. The ratios even suggest some strength gain.

The ratio of wet strength tensile to dry strength tensile for purposes of the invention and the claims is determined in the machine direction of the paper substrate. Cross machine direction (CD) values were found generally consistent with the machine direction (MD) tests. For consistency, and for purposes of the claims, the tensile testing should be in the machine direction (MD).

Paper includes paper, paperboard, kraft pulp, as ground wood, mechanical pulp, or chemical pulp including soda process pulp, sulfite process pulp, and sulfate process pulp, whether bleached or unbleached. Use of unbleached pulp is favored because of its lignin content for producing an agricultural mulch.

For purposes of the invention, extensible paper is preferred. Extensible paper typically has more paper machine direction strength. Extensible paper would have typically 5% or more stretchability in the machine and cross machine directions. The ability of the paper to stretch reduces tearing or breaking during the mechanical operations of laying, covering the edges of the mulching composite, and planting by machine.

Extensible paper is a stretchable paper and is advantageously used in the invention by being able to conform to the surface to which it is applied. Extensible paper can be made by a variety of methods such as the Clupak process, Expando process or Mikrokrep process. Such processes are disclosed in patents such as U.S. Pat. Nos. 3,362,869 and 3,329,562 incorporated herein by reference.

Elongation is determinable by standard methods such as TAPPI T 404em-92 and more preferably TAPPI Useful Method 457 "Crepe in Paper (Stretch on Rule)".

The agricultural mulch paper substrate has side edges and end edges. Typically the substrate is a long roll unwinding into a rectangular strip the length of a furrow for planting. A preferred variation involves coating the side edges with a latex material, preferably the same film-forming latex as in the first or second coating.

The side edges can be conveniently coated while the substrate material is in roll form by lightly painting or spraying the latex onto the sides of the roll before unwinding. Dow™ 620 or Genflo™ 5068 was preferred. The end edges of the rectangular strip can be optionally coated with the latex.

The film-forming latex for the top and bottom coats is an elastomeric latex, such as styrene butadiene latex. Carboxylated styrene butadiene latex such as Dow™ 620 or Genflo™ 5068 was preferred.

The latex is a water emulsion of a film-forming material. Latexes are dispersions of either elastomeric or amorphous thermoplastic polymer particles in water. These are typically oily droplets or low molecular weight oligomers. The lattices useful in the invention must be capable of forming a continuous film that is resistant to water permeability.

Latices useful in the invention are oil in water emulsions forming a film at drying temperature of less than 100° C. Emulsions of low molecular weight oligomers that form films at less than 100° C. are such oil in water emulsions for purposed of this invention.

Latexes with rubber character were found most likely to meet the criteria of the invention. Latices such as polyvinyl chloride, for example, Air Products Airflex™ 4530 which is ethylene vinyl chloride was found to not meet the water permeability test. Polyvinylide chloride as a homopolymer similarly lacks sufficient rubber character. Copolymerization of such homopolymer with polymers with more rubber character may increase the likelihood of meeting the criteria of the invention. Polychloroprene which has repeating units of 2-chloro-1, 3-butadiene has more rubber character and would accordingly be expected to be functional.

The main elastomeric latexes useful in the invention are: styrene butadiene, carboxylated styrene butadiene, natural rubber latex, neoprene nitrile, carboxylated acrylonitrile butadiene, natural rubber latex, neoprene nitrile, carboxylated acrylonitrile butadiene styrene, styrene acrylic, poly-acrylonitrile butadiene, acrylonitrile, polystyrene, polyacrylics, or their copolymers.

Latices are typically colloidal dispersions of polymers prepared by direct emulsification of the bulk polymer in an aqueous medium. Such lattices are generally stabilized by surfactants.

For industrial purposes, latices are often produced by emulsion polymerization. A monomer or mixture of monomers is emulsified in water and polymerization is induced in the aqueous phase by an initiator. Surfactants are useful in emulsion polymerization. Their absorption at the interface lowers the interfacial tension between the dispersed and continuous phases and surrounds the particles with a firmly-bound water envelope, stabilizing the emulsion against coagulation. The absorbed layers of amphipathic surfactants are oriented in such a way that their hydrophilic polar heads are pointing into the continuous phase, while the hydrophobic nonpolar tails are anchored in the dispersed phase. Various elastomeric latexes are available commercially.

To the polymer in a stable aqueous dispersion, modifying additives such as plasticizers and fillers may be added to the latex to alter the properties of a coating produced by application of the modified dispersion or latex.

For the agricultural mulch configuration of the invention, addition of hydrophilic polymers to either the top or bottom coating is not desired in that the water permeability characteristics would typically be adversely affected. Nevertheless, to facilitate coating hydrophilic polymers such as starches or carboxylated methyl cellulose can be added to the coatings in a rheologically effective amount.

The first coating on the top surface should have a water contact angle of at least 50°. Preferably, the top coat of the agricultural mulch has a water repellant added to it to increase the water angle of contact to at least 70°. A method for determining angle of contact is set forth in TAPPI method T458om-89. The interior angle between the baseline of the drop of water and the tangents to the curve at the point of contact with the base line is the angle of contact. The angle of contact (C) at 5 seconds determined by said TAPPI method is intended as the angle of contact measurement for purposes of this invention.

The water repellant can be selected from compounds such as paraffin wax, fluorinated compounds such as Scotchban™, silicones, and the like. Examples of suitable fluorinated compounds are set forth in U.S. Pat. Nos. 4,074,009 and 3,574,791 incorporated herein by reference. Paraffin wax was preferred.

In the coatings of the instant invention there can also be included pigments, such as those described on fillers in the "Encyclopedia of Polymer Science and Technology," John Wiley & Sons, Inc., New York: Fillers, Vol. 6, page 740. Suitable pigments include, but are not limited to, water insoluble silicates, oxides, clays, calcined clays, carbon black, carbonates, silicates, sulfates, sulfites, diatomaceous earth, and polymeric fibers. Other such pigments that can be added to the latex preferably include clays such as ansilex clays, urea-formaldehyde pigments, titanium dioxide, silicone dioxide, talc, aluminum hydroxide, and calcined kaolin clay.

Binders can optionally be included in addition to the film-forming latex. The latex itself has binding character and can be effectively utilized by itself without additional binder or plasticizer. Additional binder is optional and if desired, can be selected from materials such as polyvinyl alcohols, hydroxyethyl cellulose, starches and gelatins. Additional binder, if optionally included, should be selected to be substantially water insoluble in the finished coating. PVA's and their derivatives which are more polymerized to reduced solubility of the finished coating are more desirable. Similarly plasticizers can optionally be included. The optional plasticizers can be selected from phthalates, glycolates, glycerolates, benzoates, myristates and the like. The optional plasticizers also should be selected to be of low solubility or preferably substantially water insoluble in the finished coated. Generally, from 0.001 to 50 parts of a plasticizer or mixture of plasticizer can be incorporated into 100 parts of latex.

The mulching composite of the invention is not water permeable when manufactured. Under field conditions, the contact angle of water in contact with the film was observed to decrease over time and porosity increased reflecting an increase in hydrophilic character or water permeability. The bottom coating becomes permeable faster than does the top coat allowing moisture penetration to the paper fibers. The top coating is much slower to change from hydrophobic to a hydrophilic character, thus giving rise to a "diode" type of effect. The coated paper becomes permeable in one direction and impermeable to water in the opposite direction. A quantity of water becomes held in the paper fibers facilitating the biodegradation process.

Surfactants can be added to the coat-forming material to regulate the surface energy of the dispersed polymer and thereby improve the blending and dispersion of the polymer and other additives into a composite. Anionic, cationic, nonionic or amphotedc surfactants, including sulfated, sulfonated, or carboxylated esters, amides, alcohols, ethers, aromatic hydrocarbons, aliphatic hydrocarbons, acylated amino acids and peptides can be used. Ditertiary acetylene glycol was preferred. Examples of surfactants include potassium laureate, sodium alkylsulfates such as sodium dodecyl sulfate, hexadecylsulphonic acid, sodium dioctylsulphosuccinate, hexadecyl(cetyl) trimethylammonium bromide, dodecylpyridinium chloride, dodecylamine hydrochloride, N-dodecyl-N, N-dimethyl betaine, bile acids and salts, acacia, tragacanth, polyoxyethylated nonylphenols (Igepal), sorbitol esters (Spans), polysorbates (Tweens), polyoxyethylated octylphenois (Triton-X analogs), polyoxyethylene lauryl ethers, polyoxyethyleneacetyl ethers, polyoxyethylene stearyl ethers, polyoxyethylene oleyl ethers (Brij analogs), polyoxyethylene stearates (Myrj analogs), poloxamer and poloxamine type polyoxyethylene-polyoxypropylene derivatives (pluronics and tetronics). Suitable surfactants can be selected for blending with coat-forming materials by using the surfactant's hydrophilelipophile balance number, HLB, which represents the proportion between the weight percentages of hydrophilic and lipophilic groups in a surfactant. The higher the HLB, the more hydrophilic the surfactant and the lower the number the more lipophilic the surfactant. The required HLB number for blending coat forming materials is determined by selecting a surfactant with a known HLB number, blending it with the materials and observing the results. A uniform composite is formed with the correct HLB number while a non-uniform mixture indicates a different number is needed. This new number can be selected by using the prior HLB number as a guide. The HLB number is known to the art for many surfactants, and they can be experimentally determined. Generally a HLB number of 10 or less indicates lipophilic behavior and 10 or more indicates hydrophilic behavior. Also, HLB numbers are algebraically additive. Thus, by using a low number with a high number, blends of surfactant can be prepared having numbers intermediate between the two numbers. The concept of HLB is detailed in Remington's Pharmaceutical Sciences, 16th Ed., Mack Pub. Co., (1980), pages 316–319. The amount of surfactant needed is an amount that when blended with a coat-forming materials will form the desired coat composite, and it will vary according to the particular surfactant and materials that are blended to form the coating. Generally, the amount of surfactant will range from about 0.001 part up to 40 parts for 100 parts of coating.

The process to produce the desired coat formulation involves the addition to the latex of plasticizer, surfactant and any other desirable additives and pigments, such as carbon black and mixing with a high shear mixer. Coating can be accomplished using conventional coating apparati and techniques. Application via an air knife is found to produce a coating that better follows the raised contours of the surface of the substrate. Solids as high as practical to form a coherent latex film is desired.

The underside or bottom of the substrate is coated with the latex and a biologically active material. This active material can be selected from one or more of herbicide, bactericide, fungicide, insecticides, nematocides, nutrients, trace elements, vitamins, pheromones or fertilizer. The active material is adhered to the bottom of the latex coated substrate preferably in or on a water-soluble carrier or binder such as starch.

Examples of useful herbicides include alachlor, aptam, flurochloridone, vernolate, trifluralin, 2,4-D, diquat, paraquat, hexazinone, fomesafen, metribuzin.

Examples of useful insecticides include pirimiphosmethyl, methoprene, fonofos, trefluthrin, methyl parathion, ethyl parathion, permethrin, pyrethrin, fenithrothion, chlorpyriphos, diazinon, cycloheximide, chlorpydphos, phorate, carbosulfan, enpethrin. Rodenticides include warfarin. Examples of useful fungicides include copper-8-quinolinolate, copper sulfate, tributyltin fluoride, diclobutrazol, ethirimol, flutdafol. Examples of pheromones include compounds such as Z, ZZ E 7, 11-hexadecadienyl acetate.

The fungicide such as copper-8-quinolinolate, can be included in either the bottom coating or more advantageously impregnated into the paper substrate or incorporated in the papermaking process at the head box to serve as a paper fungicide to slow degradation of the paper.

Fertilizers include urea and other nitrogen-containing compounds which help promote plant growth. Nutrients can include materials such as urea, phosphates, potassium salts and complexes, trace metals or their salts, nitrogenous compounds, nitrate salts and others in their simple or complex form. The various nutrients can include some or all of the nutrients required for the crop during the growing season.

If desired, the biologically active material can be microencapsulated and included in or on the coating on the bottom side of the substrate. A binder material such as starch, hydroxyethylcellulose, methylcellulose, gelatin then often is needed. Often the film forming latex itself can also act as the binder material. Microencapsulating the biologically active material has the advantages of adding timed release capabilities and longer field life to the active material or stability and carry through processing and storage.

Microencapsulation methods which are useful are the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine in an aqueous vehicle as taught by Brown et al., in U.S. Pat. No. 4,552,811, incorporated herein by reference, also gelatin capsules and capsules produced by interfacial polymerization. Gelatin capsules are well known taught in such patents as U.S. Pat. Nos. 2,800,457; 3,041,289; and 3,533,958; incorporated herein by specific references. Gelatin capsules are preferred. Encapsulation methods of various types are disclosed in U.S. Pat. Nos. 4,277,364; 3,516,941; 4,001,140; 3,755,190; and 4,087,376.

EXAMPLES

An agricultural mulch is tested and prepared as disclosed in Examples 1 and 2 of the copending application Ser. No. 08/660,894 filed Jun. 10, 1996 now U.S. Pat. No. 5,672,434, the description of which is incorporated herein by reference. The mulch is laid down on a growing field between furrows as illustrated in FIGS. 2 and 3. The field longevity of the paper mulch is greatly improved and the product remains intact through the entire growing season. Product durability improves compared to areas where the double "tuck" layer is not used as in FIG. 1. Even if the paper remains in place after the edges have deteriorated, soil moisture below the mulch is not retained as well as when the edges are intact, and may affect crop growth and yields.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An agricultural mulch strip for covering a growing section of an agricultural field with furrows, comprising an extensible paper substrate having a top surface, a bottom surface, and two side sections having edges for contacting soil on either side of the growing section along the furrows, wherein the side sections are turned upward and bent back over the top surface of the paper substrate for receiving a deposit of soil to anchor the mulch as the mulch strip is laid down on the furrows on either side of the growing section.

2. The agricultural mulch according to claim 1, wherein said paper substrate has (a) the top surface coated with a first coating which comprises a film-forming latex resistant to water permeability, a pigment and a water repellant; (b) the bottom surface coated with a second coating which comprises a film-forming latex, a pigment and a biologically active material; and (c) the two side sections having edges which are bendable upwards and back over the top surface of the paper substrate to form a tuck capable of receiving a soil deposit on the bottom surface of the paper substrate as the mulch is laid down on the furrows and growing section of the agricultural field.

3. The agricultural mulch according to claim 1, wherein said paper has an elongation of at least 5% in the machine and cross machine directions of formation of the paper substrate.

4. The agricultural mulch according to claim 2, wherein said film-forming latex comprises an oil in water emulsion forming a film at drying temperatures of less than 100° C.

5. The agricultural mulch according to claim 2, wherein said first coating is sufficient to form a coat weight of 8 to 18 grams per square meter of the paper substrate.

6. The agricultural mulch according to claim 2, wherein said second coating is sufficient to form a coat weight of 8 to 18 grams per square meter of the paper substrate.

7. The agricultural mulch according to claim 2, wherein said paper substrate has a weight of from 37 to about 97 grams per square meter of the paper substrate.

8. The agricultural mulch according to claim 2, wherein the first coating has a water contact angle of at least 50°.

9. The agricultural mulch according to claim 2, wherein said mulch has a ratio of wet tensile strength to dry tensile strength of from about 0.9 to about 1.7.

10. The agricultural mulch according to claim 2, wherein the latex is a styrene butadiene latex or a carboxylated styrene butadiene latex.

11. The agricultural mulch according to claim 2, wherein the pigment is a member selected from the group consisting of carbon black, clay, calcium carbonate, urea formaldehyde pigment and calcined clay.

12. The agricultural mulch according to claim 2, wherein the latex on the bottom surface includes additionally at least one biologically active material selected from the group consisting of herbicide, plant nutrient, trace element, pheromone, insecticide, fungicide and fertilizer.

13. The agricultural mulch according to claim 2, wherein the paper substrate contains copper-8-quinolinate.

14. The agricultural mulch according to claim 2, wherein the first and second coatings in addition contain a binder.

15. The agricultural mulch according to claim 12, wherein the biologically active material is microencapsulated.

16. The agricultural mulch according to claim 2, wherein the water repellant is a paraffin wax or a polyfluorocarbon.

17. The agricultural mulch according to claim 2, wherein the biologically active material is copper-8-quinolinate.

18. The agricultural mulch according to claim 1, wherein a crease is formed along each of the side sections where the side sections are turned upward and bent back, each of the side sections having two portions of the paper substrate on each side of the crease, the top surfaces of each portion of the side sections being in abutting engagement when the side sections are turned upward and bent back.

19. The agricultural mulch according to claim 1, wherein a middle section is provided between the two side sections of the paper substrate and wherein at least one of the side sections is at an angle relative to the middle section when the side sections are turned upward and bent back.

20. A method of protecting a strip of agricultural mulch from being removed prematurely from a growing field in which said agricultural mulch has been deposited, the method comprises the steps of:

positioning the mulch between furrows in the field, said mulch comprising: a) an extensible paper substrate having a top surface and a bottom surface; b) a first coating on the top surface, said first coating comprising a film-forming latex resistant to water permeability, a pigment, and water repellant; c) a second coating on the bottom surface, said second coating comprising a film forming latex, a pigment and a biologically active material; and d) two side sections having edges over which soil from the furrow can be deposited as the mulch is laid onto the field between the furrows;

turning up and bending back over the top surface at least one section of the strip adjacent to said side edges as the mulch is laid down on the furrow; and covering the bottom surface of said side section with soil to anchor the strip to the furrow and prevent degradation of the mulch by weathering and premature removal from the growing field.

21. A strip of agricultural mulch prepared by the method of claim 20.

22. In a method of laying a strip of agricultural mulch onto a growing field with furrows wherein said agricultural mulch comprises: a) an extensible paper substrate having a top surface and a bottom surface; and b) two side sections having edges over which soil from the furrow is deposited as the mulch is laid onto the growing field with furrows, the improvement comprises turning up and bending back over the top surface of said paper substrate at least one section of the strip adjacent to said side edges as the mulch is laid down on the field with furrows, and covering the bottom surface of said side section with soil to anchor the strip of agricultural mulch to the furrow.

\* \* \* \* \*